United States Patent [19]

Ettel et al.

[11] Patent Number: 5,700,363
[45] Date of Patent: Dec. 23, 1997

[54] POROUS NICKEL ELECTRODE SUBSTRATE

[75] Inventors: Victor Alexander Ettel, Mississauga; John Ambrose, Burlington; Kirt Kenneth Cushnie, Walker's Line; James Alexander E. Bell, Oakville; Vladimir Paserin; Peter Joseph Kalal, both of Mississauga, all of Canada

[73] Assignee: Inco Limited, Toronto, Canada

[21] Appl. No.: 601,738

[22] Filed: Feb. 15, 1996

[51] Int. Cl.⁶ .................................................. C25D 3/12
[52] U.S. Cl. .................. 205/271; 205/111; 205/112; 205/136; 205/150; 29/623.4; 29/623.5
[58] Field of Search .................. 204/290 R, 284, 204/286; 429/223, 233, 235, 236, 237, 241, 242, 245; 29/623.1, 623.5, 623.4; 205/95, 111, 112, 136, 150, 255, 271

[56] References Cited

U.S. PATENT DOCUMENTS

| | | | |
|---|---|---|---|
| 3,649,865 | 3/1972 | Holmes | 205/150 |
| 4,102,755 | 7/1978 | Brugger et al. | 205/271 |
| 4,555,317 | 11/1985 | Nicolas et al. | 205/111 |
| 4,916,098 | 4/1990 | Ménard et al. | 205/271 |
| 4,957,543 | 9/1990 | Babjak et al. | 148/13 |
| 4,978,431 | 12/1990 | Brannam et al. | 204/28 |
| 5,098,544 | 3/1992 | Brannam et al. | 204/206 |
| 5,197,993 | 3/1993 | Ferrandon et al. | 29/2 |
| 5,300,165 | 4/1994 | Sugikawa | 427/124 |
| 5,344,723 | 9/1994 | Bronoel et al. | 429/84 |
| 5,362,580 | 11/1994 | Ferrando et al. | 429/245 |
| 5,374,491 | 12/1994 | Brannam et al. | 429/218 |
| 5,496,650 | 3/1996 | Sugikawa | 428/548 |
| 5,508,114 | 4/1996 | Sugikawa | 428/548 |
| 5,584,983 | 12/1996 | Pruyn | 205/271 |

FOREIGN PATENT DOCUMENTS

| | | |
|---|---|---|
| 0402738 | 12/1990 | European Pat. Off. |
| 0595757 | 5/1994 | European Pat. Off. |
| 9222936 | 12/1992 | France |

OTHER PUBLICATIONS

Japanese Patent Abstract—61218067—Sep. 27, 1986.
"Sealed Bipolar Ni–Cd Batteries", by G. Bronoel, N. Tassin, R. Rouget, T. Potlier—1992 IEEE 35th International Power Sources Symposium no month available.

*Primary Examiner*—Bruce F. Bell
*Attorney, Agent, or Firm*—Edward A. Steen

[57] ABSTRACT

A porous nickel electrode substrate having a central high conductivity core sandwiched between two layers of porous conductive material such as nickel foam or nickel felt. The porous conductive material is plated with nickel and then sintered. By selectively controlling the plating of nickel on the porous material, variable conductivities may be designed into the substrate.

4 Claims, 1 Drawing Sheet

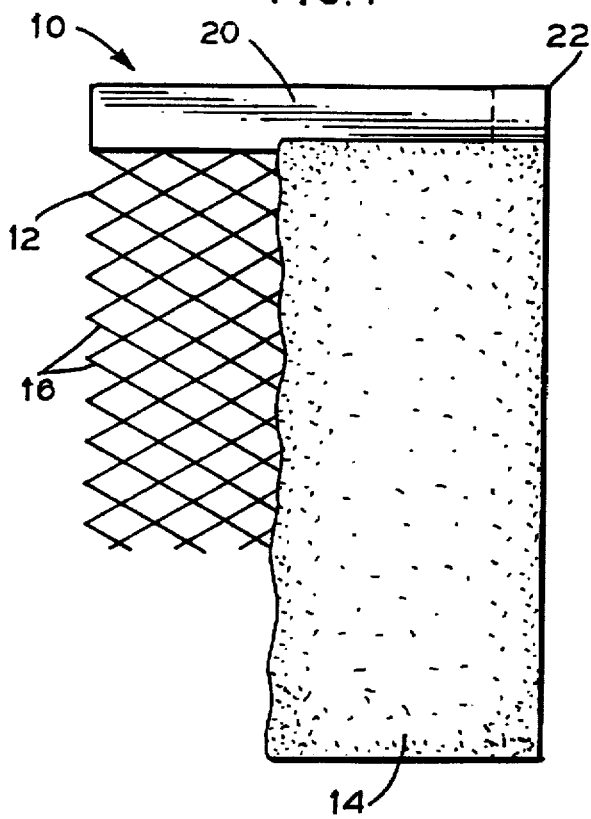
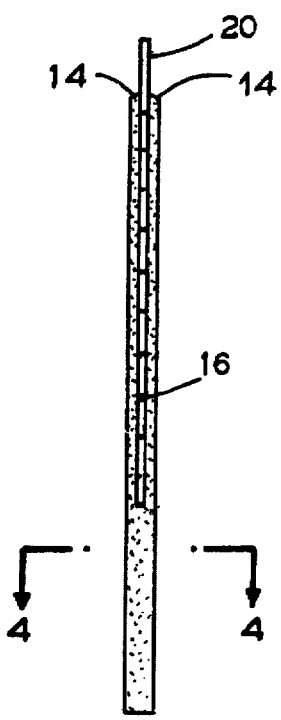
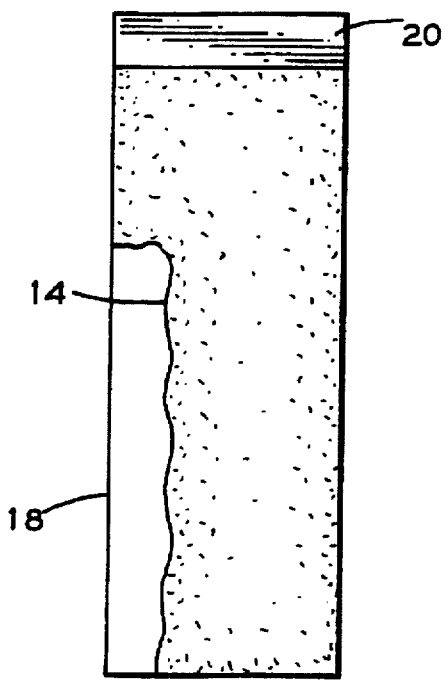
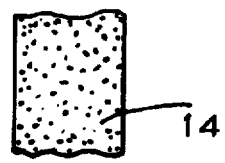

POROUS NICKEL ELECTRODE SUBSTRATE

TECHNICAL FIELD

The instant invention relates to battery electrodes in general, and more particularly, to a porous nickel electrode substrate having variable conductivity and reduced weight.

BACKGROUND ART

Due to increasing political and environmental pressures, electric vehicles ("EV's") are being championed as a means for reducing vehicle borne pollutants. The main recognized weakness of EV's are their battery systems. Much research is being conducted to raise the energy density and reduce the weight of existing and promising battery systems.

An EV battery must allow sufficient driving range between recharges, have low maintenance, give adequate acceleration and permit safe rapid recharging, both when needed by the user and during regenerative braking. The cost of the battery and any replacement(s) that may be required during the life of the vehicle must also be low enough to make the non-polluting EV an attractive choice for the consumer.

For example, in 1991 an attempt to define the above criteria was made by the United States Advanced Battery Consortium (USABC):

|  | Mid Term | Long Term |
| --- | --- | --- |
| Specific Energy, Wh/kg | 80–100 | 200 |
| Specific Power, W/kg | 150–200 | 400 |
| Cycle Life, 80% DOD cycles | 600 | 1000 |
| Ultimate Price, $/kWh | <$150 | <$100 |
| Recharge Time | <6 hrs | 3–6 hrs |
| Fast Recharge | 40–80% SOC in <15 min. | 40–80% SOC in <15 min. |
| Operating Environment | −30 to 65° C. | −40 to 85° C. |

A better touchstone than the separate cost of kWh and cycle life criteria is the combination thereof. That is, the battery cost per distance (mile or kilometer) over the life of the vehicle. It is ultimately a long battery life that will drive the economics of EV's.

Many batteries today meet or excel in some of the above criteria but fail or are marginal in others. For example, lead acid batteries excel in cost per kWh, are marginal in the cycle life criterion, and are insufficient in energy density which affects driving range.

Nickel cadmium and nickel metal hydride batteries offer fair to good energy density and other performance properties, but currently fail to meet the cost per kWh criteria because of their high manufacturing costs. Cost of primary materials is not unacceptably high. For example, the traditional design of a NiCd battery with a sintered nickel plaque positive electrode and a pasted negative electrode usually contains (per kWh of capacity) about 4.5 pounds (2 kg) of nickel in the active mass and about 5.5 pounds (2.5 kg) in the current distributing plaque. Ten pounds (4.5 kg) of nickel metal corresponds to around $40 per kWh. Eight pounds (3.7 kg) of cadmium per kWh corresponds to only $17 per kWh. Yet the price of a manufactured NiCd battery is over $500 per kWh, as compared to the price of comparable lead acid battery of only $150/kWh.

The difference between the cost of these batteries ($350/kWh) is much more than the difference in the cost of materials because it reflects the complicated, labor intensive process of making NiCd batteries incorporating sintered electrodes as compared to the simple, high speed grid production and pasting of lead acid batteries.

Similar high speed pasting of nickel batteries is possible when using nickel foam or similar substrates developed for this specific purpose and manufactured in large volume to reduce cost. Large cost savings may be realized by reducing the number of operations required in electrode manufacture and/or simplifying them.

Another expensive operation that raises the cost of NiCd batteries is attaching electrode tabs to the porous sheets by welding. This is usually done after pasting the electrode strip and cutting it into individual electrodes. To successfully weld a tab to the porous sheet, the weld area must be cleaned of active mass. Furthermore, the weld joint is a point of weakness and the unavoidable vibrations during vehicle use may result in weld break and premature electrode failure.

A similar undesirable task is welding porous sheets to the non-porous central foil in manufacturing of bipolar electrodes.

SUMMARY OF THE INVENTION

Accordingly, there is provided a porous nickel electrode substrate especially suited for electric vehicle battery plates. The substrate comprises a central high conductivity core laminated on both sides with a porous layer consisting of nickel foam or nickel felt. The design results in enhanced performance with a concomitant reduction in weight when compared to conventional electrodes made with plated porous central sheets.

BRIEF DESCRIPTION OF THE DRAWINGS

FIG. 1 is a plan view of an embodiment of the invention.

FIG. 2 is a side view of an embodiment of the invention.

FIG. 3 is a plan view of an embodiment of the invention.

FIG. 4 is a representative view taken along lines 4—4 of FIG. 2.

PREFERRED MODE FOR CARRYING OUT THE INVENTION

The instant invention relates to a porous nickel substrate with engineered variable conductivity suitable for manufacturing EV battery plates with enhanced performance and minimized weight.

FIG. 1 shows a porous electrode substrate 10 consisting of a high conductivity core 12 laminated on both sides with a layer of porous conductive material 14 such as nickel plated foam or nickel plated felt.

The central core 12 provides mechanical strength and electrical conductivity whereas the two porous layers 14 distribute the electrical current throughout the active mass to be embedded therein.

By separating mechanical strength and electrical conductivity into two discrete yet related functions, it is possible to use a central core 12 with lower nickel density and lower cost without compromising the conductivity and strength of the electrode. The requisite strength and conductivity is provided by the central core 12 which can be manufactured more economically than the conventional porous sheets produced by plating pure nickel. The core 12 can be a sheet of reticulated expanded mesh 16, a solid or perforated plate 18 (See FIG. 3), or a conductive plastic such as polypropylene/carbon black composite. More particularly, the electrically conductive core 12 may be made from nickel plated steel, nickel, or copper.

The central core 12 may incorporate one or more solid sections 20 to permit curing out electrodes (transversely or longitudinally) with tabs 22 formed from these sections 20. The central core 12 may also have variable conductivity to provide high conductivity at the top section of the electrode substrate 10 which carries most of the electrode current and with reduced material density at the bottom part, which carries very little current and where high conductivity is not needed.

The composite substrate 10 can be produced by laminating two sheets of a porous organic material 14 (polyurethane foam, polyester felt, etc.) over the central expanded or perforated strip 16 followed by nickel plating and sintering of the plated composite. Another method of producing such a structure is to produce the two porous nickel structures first, sandwiching them about the central core 12 and sintering the combination together.

Electrolytic (e.g. U.S. Pat. Nos. 4,978,431; 5,098,544 and 5,374,491), carbonyl (U.S. Pat. No. 4,957,543), or physical vapor deposition ("PVD") plating processes may be used to coat the porous material 14. In addition, a mechanical joining method such as gluing, resistance welding, etc. may be used to bond the material 14 to the central core 12.

An object of this invention is an efficient method of manufacturing a continuous strip of porous substrate that can be pasted and stamped into complete electrode substrates ready for pasting and assembling into cells and batteries.

Monopolar electrodes can also be equipped with a current distributing grid in the upper section of the electrode which has to carry much higher currents than the bottom section. In the case of a negative electrode, a copper cored substrate 10 can be used to further increase electrode conductivity and performance under high drain (acceleration) or rapid charge.

This process can also be used to produce bipolar electrodes with a solid sheet in the middle and porous sheets such as nickel foam or nickel felt on both sides, or a sandwich of solid sheet and porous nickel felt or foam.

It has been determined that gluing porous substrate layers 14 (e.g. polyurethane foam or suitable felts) to a central core 12 made from a strip of expanded metal grid attached to a continuous solid section 20, followed by plating using the carbonyl method and annealing, produces an integral structure which permits pasting and cutting into finished electrodes.

Similarly, gluing sheets of polymeric foam (or suitable polymeric, carbon or other felt 14) to the opposite sides of a center core sheet 12 permits producing, after plating and annealing, an integral substrate for a bipolar electrode.

It is also possible to join certain foams and felts to the core 12 mesh by processes other than gluing, e.g. needling or thermal bonding.

An alternate method for producing the substrates 10 involves sintering separately produced porous nickel structures together with a central sheet of expanded or perforated metal, or other suitable material, optionally equipped with solid strip to form the tabs 22 after punching out the finished electrodes.

Bipolar electrodes can also be produced by sintering or otherwise attaching porous structures to both sides of a solid sheet.

In both cases, the strength of the laminated structures can be improved by applying a layer of easily sinterable powder (such as INCO® type T-110) to the future interface.

A custom electrode structure may be obtained by controlled density variation of the nickel foam or nickel felt using the carbonyl plating process. In this process, nickel deposition is achieved by thermal decomposition of nickel tetracarbonyl on a porous substrate such as polyurethane foam or polyester felt 14. Because the deposition rate is a function of temperature, it is possible to program the plating process so that it produces a controlled variation in temperature of the substrate 10 as it passes through the plating zone and hence controlled variation in nickel density and concomitantly conductivity. Electrodes with controlled and variable conductivity can be manufactured from the continuous strip of the substrate material.

FIG. 2 is a cross-sectional view of an electrode substrate 10 having a sandwiched sintered layer 14 enveloping an expanded mesh 16 core 12. FIG. 4 is a representative view taken along lines 4—4 of FIG. 2.

FIG. 3 depicts a core 12 made from a solid nickel plate 18 enveloped by a porous conductive layer 14 prior to plating and sintering.

A number of examples were made in accordance with the teachings of the instant invention:

1. Foam-mesh sandwich was prepared using nickel mesh from Expanded Metal Corp., 0.006 inch (0.15 mm) thick, density 490 g/m$^2$, and two layers of polyurethane foam (each approx. 1.7 mm thick, 80 pores per inch [31.5 pores per cm]) glued to the mesh using Halltech™ 7191 temperature glue. The foam-mesh composite was plated with nickel by the carbonyl process, then sintered at 1000° C. in a reducing atmosphere.

2. Expanded metal foil from Delker Corp., with solid metal section (0.010 inch [0.25 mm] thick, 250 g/m), was used to prepare another sample. Polyurethane foam was again glued to both sides and the composite substrate was plated with nickel, then sintered at 1000° C.

3. A layer of carbon pitch fiber felt (1.7 mm thick, sheet density 2 oz/yd$^2$ [67.5 g/m$^2$]) was glued to both sides of Expanded Metal Corp. nickel mesh, carbonyl plated with nickel and sintered at 1000° C.

4. 0.005 inch (0.12 mm) thick nickel foil was used to prepare a composite substrate by gluing a 1.7 mm thick sheet of 110 ppi polyurethane foam to both sides, plating with nickel and sintering at 1000° C.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A process for varying the conductivity of an electrode substrate, the process comprising:
   1) providing an electrically conductive core having opposing sides,
   2) affixing at least one porous layer to each side of the core, the porous layer selected from the group consisting of foam and felt,
   3) depositing nickel from the decomposition of nickel tetracarbonyl directly onto each porous layer,
   4) causing the concentration of the nickel deposit from step 3) to vary along the substrate, and
   5) sintering the nickel deposit.

2. The process according to claim 1 wherein nickel powder is added to the substrate prior to sintering.

3. The process according to claim 1 wherein a tab is formed from the core.

4. The process according to claim 1 wherein the core is selected from the group consisting of plate, foil, mesh and expanded metal.

* * * * *